United States Patent
Nagano (10) Patent No.: US 7,552,856 B2
(45) Date of Patent: Jun. 30, 2009

(54) CLAMP APPARATUS, JOINING METHOD, AND METHOD OF MANUFACTURING HOLLOW MEMBER

(75) Inventor: Yoshitaka Nagano, Oyama (JP)

(73) Assignee: Showa Denko K.K., Tokyo (JP)

( * ) Notice: Subject to any disclaimer, the term of this patent is extended or adjusted under 35 U.S.C. 154(b) by 302 days.

(21) Appl. No.: 11/551,030

(22) Filed: Oct. 19, 2006

(65) Prior Publication Data

US 2007/0090159 A1   Apr. 26, 2007

(30) Foreign Application Priority Data

Oct. 19, 2005   (JP)   ............... 2005-304143

(51) Int. Cl.
   *B23K 5/22*   (2006.01)
(52) U.S. Cl. .............. 228/212; 228/101; 228/2.1; 269/309
(58) Field of Classification Search .......... 228/2.1, 228/112.1, 44.3, 44.4, 44.5, 212, 49.3
   See application file for complete search history.

(56) References Cited

U.S. PATENT DOCUMENTS

| | | | | |
|---|---|---|---|---|
| 4,468,161 A | * | 8/1984 | Krueger ............ | 411/171 |
| 6,641,029 B2 | * | 11/2003 | Bonnell ............ | 228/170 |
| 2005/0133482 A1 | * | 6/2005 | Clark et al. ......... | 219/76.1 |
| 2007/0062914 A1 | * | 3/2007 | Saji et al. .......... | 219/119 |
| 2008/0073409 A1 | * | 3/2008 | Ostersehlte ........ | 228/102 |

FOREIGN PATENT DOCUMENTS

JP   2002-248584   3/2002

* cited by examiner

*Primary Examiner*—Jared J Fureman
*Assistant Examiner*—Ahmed Abdel Rahman
(74) *Attorney, Agent, or Firm*—Oblon, Spivak, McClelland, Maier & Neustadt, P.C.

(57) ABSTRACT

A joining method for joining together a first member having a circular hole and a second member having a circular portion fitted into the circular hole, at and around an entire annular joint interface between a circumferential wall of the circular portion and a circumferential wall of the circular hole. The joining method includes: preparing a clamp apparatus having a clamp body and a presser member attached to the clamp body in a manner rotatable about an axis of the circular hole of the first member; and joining the first and second members together at and around the annular joint interface therebetween while clamping the second member by the presser member so as to prevent movement of the second member in relation to the first member and rotating the first and second members about the axis of the circular hole of the first member.

10 Claims, 4 Drawing Sheets

CLAMP APPARATUS, JOINING METHOD, AND METHOD OF MANUFACTURING HOLLOW MEMBER

BACKGROUND OF THE INVENTION

The present invention relates to a clamp apparatus for use in joining two members together at and around an annular joint interface therebetween, to a joining apparatus, and to a joining method. More particularly, the invention relates to a clamp apparatus used when a first member having a circular hole and a second member having a circular portion are joined together with the circular portion being fitted into the circular hole, at and around an entire annular joint interface between a circumferential wall of the circular portion of the second member and a circumferential wall of the circular hole of the first member, the clamp apparatus being adapted to clamp the second member so as to prevent movement of the second member in relation to the first member, as well as to a joining apparatus and a joining method.

Manufacture of industrial metal products for use in, for example, the automobile industry and the shipbuilding industry, may involve a step of joining together a first member having a circular hole and a second member having a circular portion fitted into the circular hole, at and around an entire annular joint interface between a circumferential wall of the circular portion of the second member and a circumferential wall of the circular hole of the first member.

Specifically, a known method of manufacturing a metal hollow member consisting of a base having a circular recess and a circular cover fitted into the recess and closing the opening of the recess is as follows. There are prepared the base having a circular recess and the cover to be fitted into the recess and to close the opening of the recess. A stepped portion is formed on the circumferential wall of the recess at an intermediate depth for allowing a circumferential portion of the cover to rest thereon. After the cover is fitted into the recess such that the circumferential portion thereof rests on the stepped portion of the recess, the base and the cover are joined together at and around an annular joint interface between the circumferential wall of the recess of the base and the circumferential wall of the cover by a fusion welding process, such as MIG (metal inert gas) welding, TIG (tungsten inert gas) welding, laser beam welding, or electron beam welding, or by a friction stir welding process.

In the fusion welding process, workpieces must be fixed against movement thereof in the course of joining, since the workpieces are subjected to pressure which is exerted on a molten pool at the time of melting or shield gas pressure, or to shrinkage force induced by welding heat. In the friction stir welding process, large force is exerted on workpieces when a probe is plunged into the interface between the workpieces and when the probe and the workpieces undergo relative movement; thus, the workpieces must be fixed more firmly than in the fusion welding process against movement thereof in the course of joining. In either case of the fusion welding process and the friction stir welding process, movement of workpieces in the course of joining causes impairment in dimensional accuracy of a product obtained by joining, or defective join.

Conventionally, in order to cope with the above problems, when a cover is to be friction-stir-welded to a base for forming a hollow member, the cover is provisionally and partially joined to the base by a general fusion welding process or a friction stir welding process (refer to, for example, Japanese Patent Application Laid-Open (kokai) No. 2002-248584).

However, since the method disclosed in the above publication includes an additional step for provisional joining, joining the cover to the base is rather troublesome. In the case where the cover is provisionally joined to the base at several points by a fusion welding process, a blowhole, cracks, lack of fusion, or a like defect is likely to arise. In order to avoid occurrence of such defect, preheating, treatment of craters, and the like must be sufficiently performed before main joining. This leads to an increase in the number of steps, thus impairing mass productivity.

SUMMARY OF THE INVENTION

One aspect of the present invention is a joining method for joining together a first member having a circular hole and a second member having a circular portion with the circular portion being fitted into the circular hole, at and around an entire annular joint interface between a circumferential wall of the circular portion of the second member and a circumferential wall of the circular hole of the first member. The joining method includes: preparing a clamp apparatus having a clamp body and a presser member attached to the clamp body in a manner rotatable about an axis of the circular hole of the first member; and joining the first member and the second member together at and around the annular joint interface therebetween while clamping the second member by the presser member of the clamp apparatus so as to prevent movement of the second member in relation to the first member and rotating the first and second members about the axis of the circular hole of the first member.

Another aspect of the present invention is a method of manufacturing a hollow member in which a base having a circular recess and a cover to be fitted into the recess and to close an opening of the recess are prepared, a stepped portion is formed on a circumferential wall of the recess at an intermediate depth for allowing a circumferential portion of the cover to rest thereon, and, after the cover is fitted into the recess such that the circumferential portion thereof rests on the stepped portion of the recess, the base and the cover are joined together at and around an annular joint interface between the circumferential wall of the recess of the base and a circumferential wall of the cover. The method of manufacturing a hollow member includes: preparing a clamp apparatus having a clamp body and a presser member attached to the clamp body in a manner rotatable about an axis of the recess of the base; and joining the base and the cover together at and around the annular joint interface therebetween while clamping the cover by the presser member of the clamp apparatus so as to prevent movement of the cover in relation to the base and rotating the base and the cover about the axis of the recess of the base.

DESCRIPTION OF THE PREFERRED EMBODIMENTS

Embodiments of the present invention will next be described in detail with reference to the drawings. In the drawings, like sections or components throughout the several views are denoted by like reference numerals, and repeated description thereof is omitted.

In the following description, the upper and lower sides of the drawings will be referred to as "upper" and "lower," respectively.

Embodiment 1

The present embodiment is shown in FIGS. 1 to 4 and is implemented by applying a clamp apparatus according to the present invention to manufacture of a hollow member which consists of a base having a recess, and a cover fitted into the recess and closing the opening of the recess.

Figure 1:
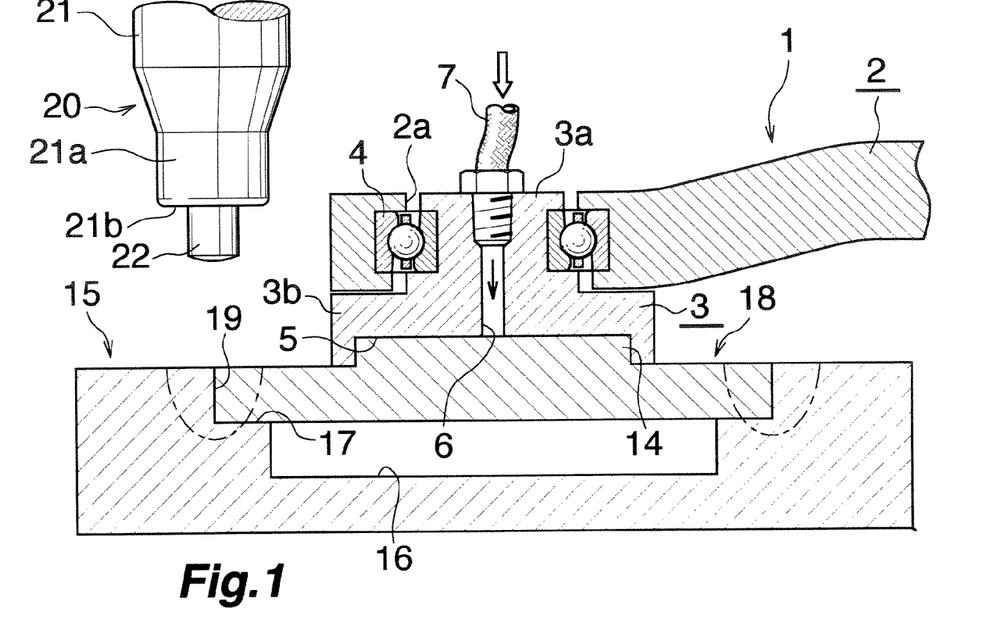
FIG. 1 is a vertical, sectional view showing a method of Embodiment 1 using a clamp apparatus according to the present invention as viewed before starting joining.
Figure 2:
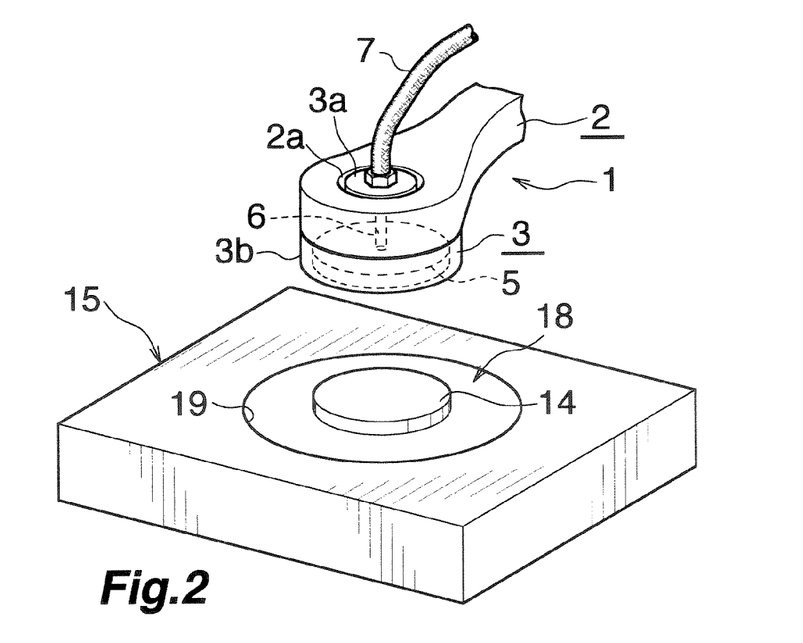
FIG. 2 is a perspective view showing the state before starting joining of FIG. 1.

A clamp apparatus 1 has an arm-like clamp body 2 and a presser member 3, which is attached to a distal end portion of the clamp body 2 in a rotatable manner. The presser member 3 includes a columnar basal portion 3a and a disklike presser portion 3b formed concentrically and integrally with the basal portion 3a. The basal portion 3a of the presser member 3 is inserted into an attachment hole 2a formed in and extending through the distal end portion of the clamp body 2 and is rotatably supported by the clamp body 2 via a roller bearing 4 which intervenes between the clamp body 2 and the basal portion 3a. Preferably, the roller bearing 4 bears a radial load and a thrust load. Components of the roller bearing 4 are formed from, usually, high-carbon chromium bearing steel, preferably, heat-resisting steel. A recess 5 which is circular as viewed from underneath is formed on the lower surface of the presser member 3 such that the axis thereof coincides with the axis of rotation of the presser member 3.

The presser member 3 of the clamp apparatus 1 has a medium supply channel 6 formed therein for supplying a cooling medium into the interior of the recess 5. The medium supply channel 6 is a through-hole which extends vertically through the presser member 3 on the axis of rotation of the presser member 3. A cooling-medium supply pipe 7 for feeding a cooling medium into the medium supply channel 6 is connected to the presser member 3 in such a manner as to communicate with an upper end portion of the medium supply channel 6. Although unillustrated, preferably, the cooling-medium supply pipe 7 is connected to the presser member 3 in such a manner as to be rotatable in relation to the presser member 3 by use of, for example, a rotary joint.

The clamp apparatus 1, a rotary table 10, a bed 11 fixedly provided on the rotary table 10, and first-member clamp devices 12 provided on the bed 11 constitute a joining apparatus. In this joining apparatus, the clamp body 2 of the clamp apparatus 1 can move vertically toward and away from the bed 11 and can move horizontally in a horizontal plane parallel with the upper surface of the bed 11.

A base 15 used to manufacture a hollow member has a recess 16 which has a circular shape as viewed in plane. The base 15 has a stepped portion 17 which projects radially inward from the circumferential wall of the recess 16 at an intermediate depth.

A cover 18 used to manufacture the hollow member has a thickness smaller than the depth of the recess 16 and equal to a depth to the stepped portion 17 of the recess 16. The cover 18 has a diameter equal to or slightly smaller than a diameter of the recess 16 as measured above the stepped portion 17. A projection 14 which has a circular shape as viewed in plane is formed coaxially on the upper surface of the cover 18. The projection 14 has such a height and diameter as to be substantially fitted into the recess 5 of the presser member 3 of the clamp apparatus 1.

The base 15 and the cover 18 are formed from, for example, any one of JIS 2000 aluminum alloys, JIS 5000 aluminum alloys, JIS 6000 aluminum alloys, and JIS 7000 aluminum alloys. The base 15 and the cover 18 may be formed from the same material or from different materials.

By use of the base 15 and the cover 18, a hollow member is manufactured as follows. First, the base 15 is placed on the bed 11 of the rotary table 10 and is then clamped on the bed 11 by means of the first-member clamp devices 12.

Next, the cover 18 is fitted into the recess 16 of the base 15 such that a circumferential portion thereof rests on the stepped portion 17, thereby making the upper surface of a portion of the base 15 around the recess 16 and an upper surface of the cover 18 flush with each other.

Next, the cover 18 is clamped on the base 15 by means of the clamp apparatus 1. Specifically, the clamp body 2 is moved horizontally in a horizontal plane parallel with the surface of the bed 11 and is moved toward the bed 11 so as to fit the projection 14 of the cover 18 into the recess 5 of the presser member 3. Additionally, force directed toward the bed 11 is applied to the clamp body 2, thereby clamping the cover 18 on the base 15 by means of the presser member 3. The circumferential wall of the recess 16 of the base 15 and the circumferential wall of the cover 18 form an annular joint interface 19 therebetween.

Figure 3:
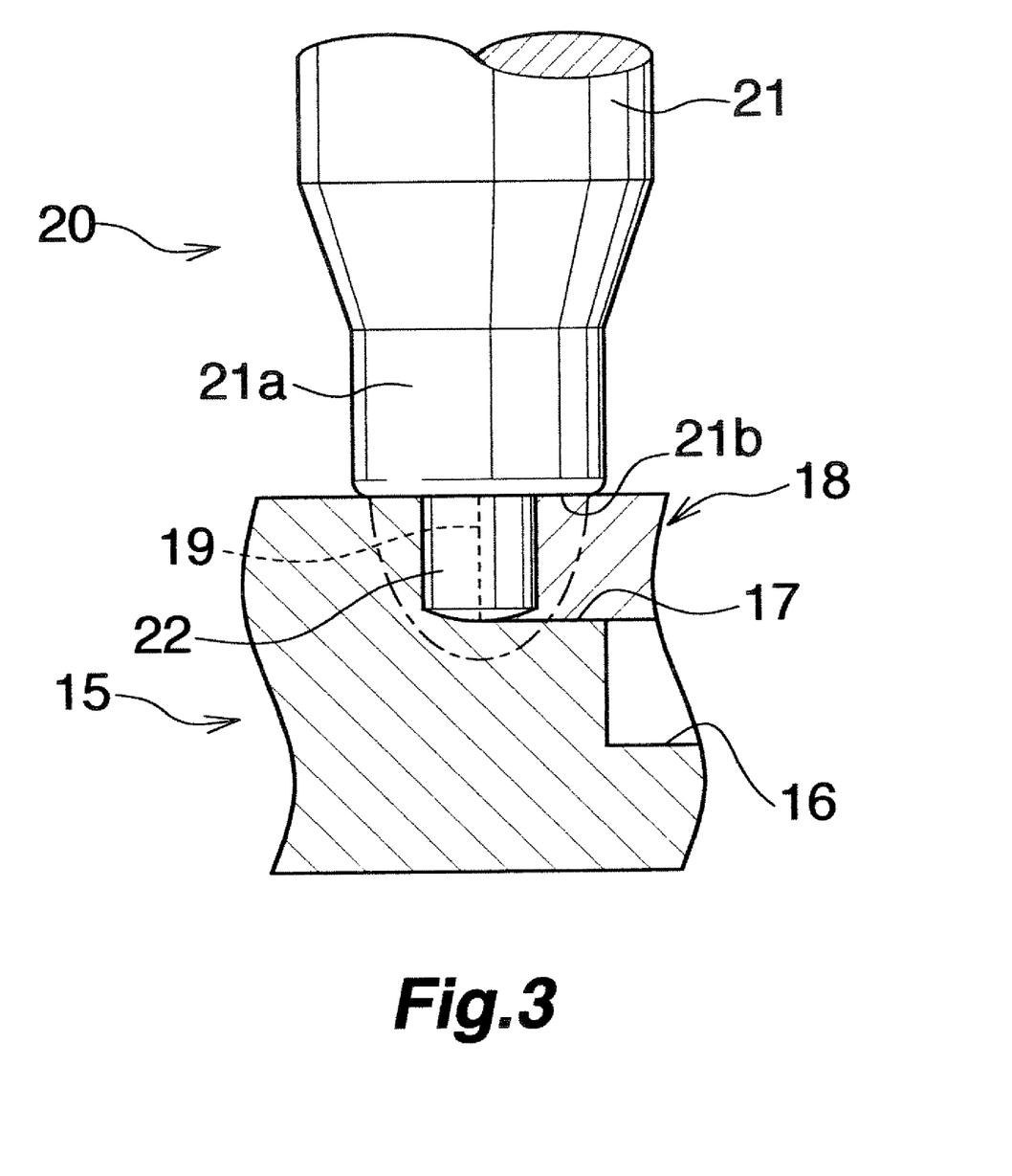
FIG. 3 is a vertical, sectional view showing the method of Embodiment 1 using the clamp apparatus according to the present invention as viewed after starting joining.

Next, by use of a friction-stir-welding tool 20, the base 15 and the cover 18 are friction-stir-welded together at and around the annular joint interface 19.

The friction-stir-welding tool 20 includes a columnar rotor 21 and a pin-like probe 22. The columnar rotor 21 has a small-diameter portion 21a which is coaxially and integrally formed at a distal end portion thereof via a taper portion. The probe 22 is coaxially and integrally formed on the end surface of the small-diameter portion 21a of the columnar rotor 21 and has a diameter smaller than that of the small-diameter portion 21a. The rotor 21 and the probe 22 are formed from a material which is harder than the base 15 and the cover 18 and is resistant to frictional heat generated in the course of joining.

While the rotor 21 and the probe 22 of the friction-stir-welding tool 20 are rotated, the probe 22 is plunged from the outside into the annular joint interface 19 at a certain circumferential position so as to be plunged into portions of the base 15 and the cover 18 which are located on opposite sides of the annular joint interface 19. Also, a shoulder portion 21b of the tool 20 located between the small-diameter portion 21a and the probe 22 is pressed against the upper surfaces of the base 15 and the cover 18 (see FIG. 3).

Figure 4:
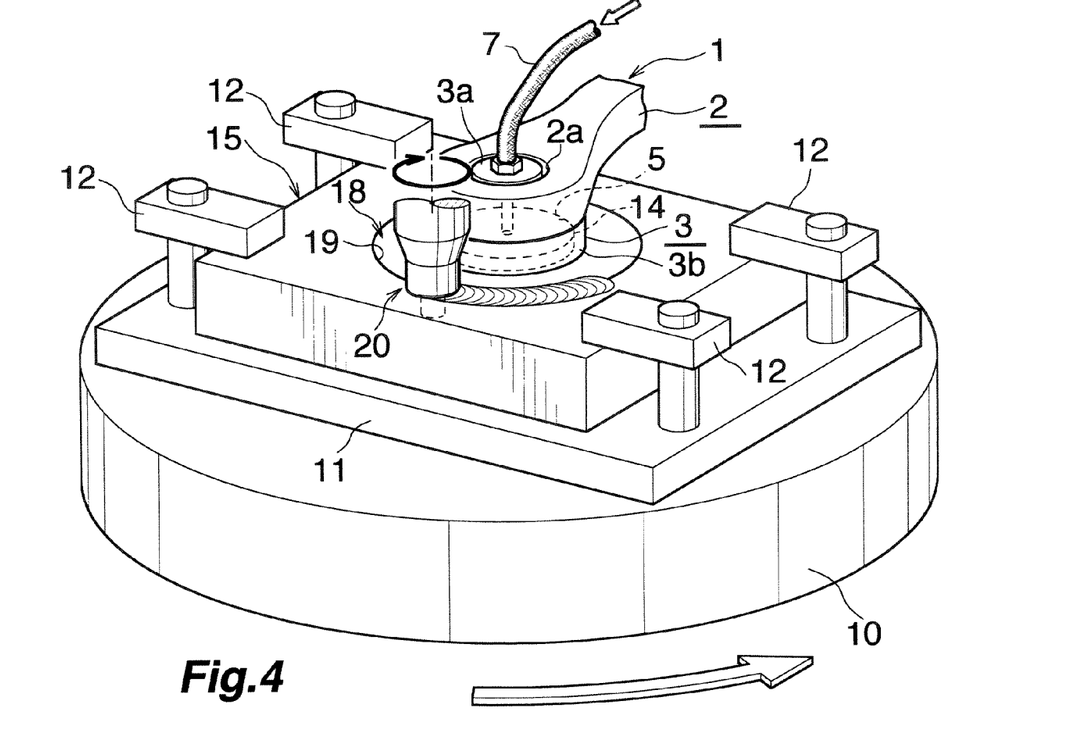
FIG. 4 is a perspective view showing the method of Embodiment 1 using the clamp apparatus according to the present invention as viewed after starting joining.

Next, while the rotor 21 and the probe 22 are rotated, the base 15 and the cover 18, and the friction-stir-welding tool 20 are caused to undergo relative movement so as to move the probe 22 along the annular joint interface 19.

By this procedure, frictional heat generated by rotation of the probe 22 and frictional heat generated by rubbing of the shoulder portion 21b against the base 15 and the cover 18 soften the base metal(s) of the base 15 and the cover 18 in the vicinity of the annular joint interface 19. The thus-plasticized metal is stirred and mixed through subjection to the rotative force of the probe 22 and is transferred in such a manner as to fill a groove that is formed through passage of the probe 22. Subsequently, the plasticized metal quickly loses frictional heat to thereby be cooled and solidified. This phenomenon repeatedly occurs as the probe 22 moves, whereby joining between the base 15 and the cover 18 progresses (see FIG. 4).

In the course of friction-stir-welding the base 15 and the cover 18 together, a cooling medium is continuously fed into the medium supply channel 6 through the cooling-medium supply pipe 7. Preferably, the cooling medium is of gas phase. The cooling medium removes the above-mentioned frictional heat, thereby suppressing a rise in temperature of the base 15 and the cover 18, particularly an excessive rise in temperature of the cover 18 whose thermal capacity is smaller than that of the base 15.

When the probe 22 moves along the entire annular joint interface 19, the base 15 and the cover 18 are joined together at and around the entire annular joint interface 19. Preferably, after the probe 22 returns to the position where the probe 22 was plunged in, the probe 22 is caused to pass the position and to move straight in a direction tangent to the annular joint interface up to a stopper member (not shown) disposed at the periphery of the base 15. Then, the probe 22 is drawn out. The base 15 and the cover 18 are thus friction-stir-welded together, thereby yielding a hollow member.

Embodiment 2

Figure 5:
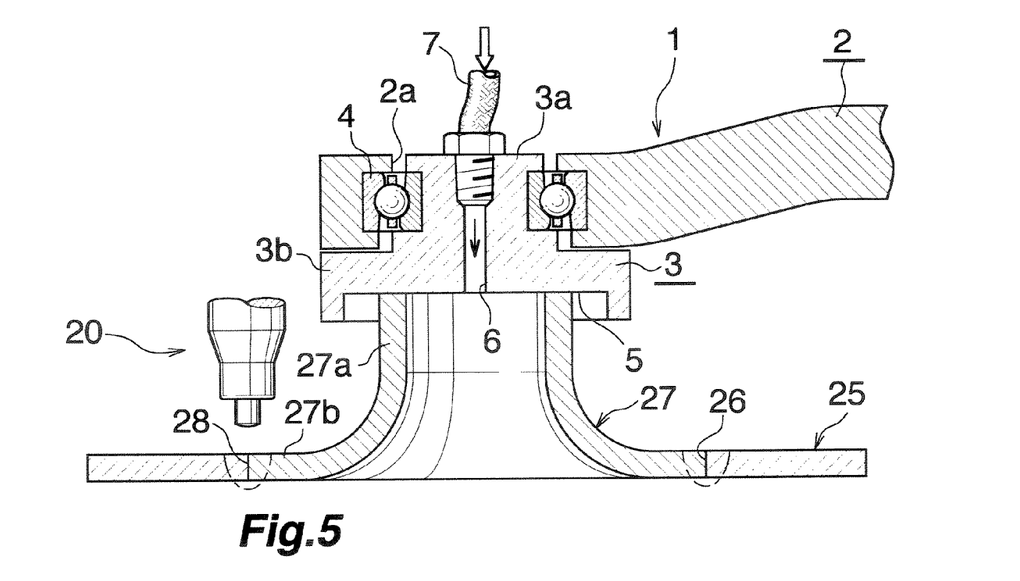
FIG. 5 is a vertical, sectional view showing a method of Embodiment 2 using the clamp apparatus according to the present invention as viewed before starting joining.

The present embodiment is shown in FIG. 5 and is implemented by applying the clamp apparatus 1 according to the present invention to joining of a first member having a circular hole and a second member having a circular portion to be fitted into the circular hole.

A first member 25 has a plate-like shape and has a circular hole 26 extending therethrough. A second member 27 consists of a cylindrical portion 27a and an outward flange 27b (circular portion), which is formed integrally with the lower end of the cylindrical portion 27a and projects radially outward and whose periphery has a circular shape. The cylindrical portion 27a and the outward flange 27b are coaxial with each other. The outward flange 27b has such an outside diameter as to be exactly fitted into the circular hole 26 of the first member 25. The thickness of the outward flange 27b is equal to that of the first member 25.

The first and second members 25 and 27 are formed from, for example, any one of JIS 2000 aluminum alloys, JIS 5000 aluminum alloys, JIS 6000 aluminum alloys, and JIS 7000 aluminum alloys. The first and second members 25 and 27 may be formed from the same material or from different materials.

Although unillustrated fully, the joining apparatus used in Embodiment 1 is used to join the first member 25 and the second member 27 together.

First, the first member 25 is placed on the bed 11 of the rotary table 10 and is then clamped on the bed 11 by means of the first-member clamp devices 12.

Next, the outward flange 27b of the second member 27 is fitted into the circular hole 26 of the first member 25, thereby making the upper surface of a portion of the first member 25 around the circular hole 26 and the upper surface of the outward flange 27b of the second member 27 flush with each other.

Then, the second member 27 is clamped on the bed 11 by means of the clamp apparatus 1 such that the axis of rotation of the presser member 3 coincides with the axis of the cylindrical portion 27a and the outward flange 27b of the second member 27, thereby making the second member 27 immobile in relation to the first member 25. Specifically, the clamp body 2 is moved horizontally in a horizontal plane parallel with the surface of the bed 11 and is moved toward the bed 11 so as to insert an upper end portion of the cylindrical portion 27a of the second member 27 into the recess 5 of the presser member 3 in such a manner that the axis of rotation of the presser member 3 coincides with the axis of the cylindrical portion 27a of the second member 27. Additionally, force directed toward the bed 11 is applied to the clamp body 2, thereby clamping the second member 27 on the bed 11 by means of the presser member 3 and thus making the second member 27 immobile in relation to the first member 25.

The circumferential wall of the circular hole 26 of the first member 25 and the circumferential wall of the outward flange 27b of the second member 27 form an annular joint interface 28 therebetween.

As in the case of Embodiment 1, by use of the friction-stir-welding tool 20, the first and second members 26 and 27 are friction-stir-welded together at and around the annular joint interface 28. In the course of friction stir welding, a cooling medium is continuously fed into the medium supply channel 6 through the cooling-medium supply pipe 7. Preferably, the cooling medium is of gas phase. The cooling medium removes frictional heat, thereby suppressing a rise in temperature of the first and second members 25 and 27.

Embodiment 3

Figure 6:
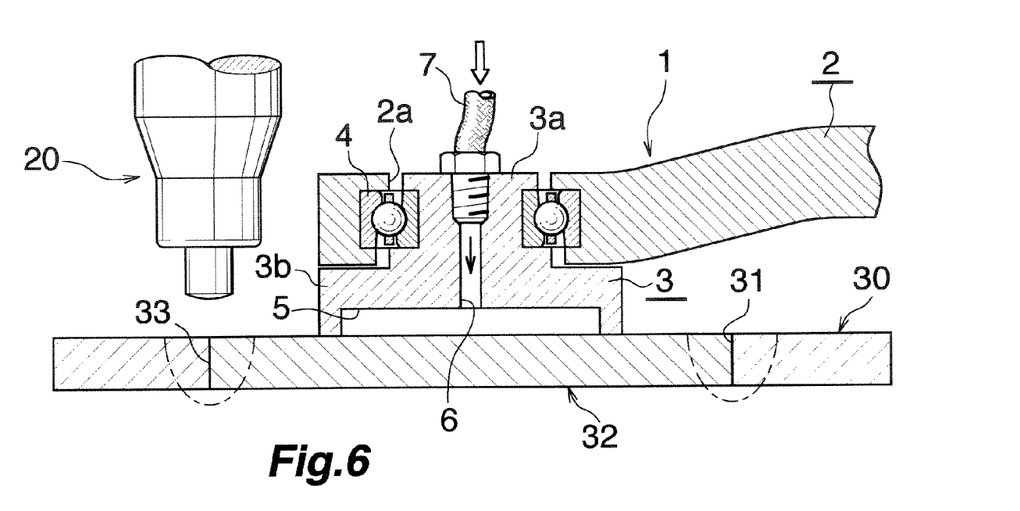
FIG. 6 is a vertical, sectional view showing a method of Embodiment 3 using the clamp apparatus according to the present invention as viewed before starting joining.

The present embodiment is shown in FIG. 6 and is implemented by applying the clamp apparatus 1 according to the present invention to joining of a first member having a circular hole and a second member having a circular portion to be fitted into the circular hole.

A first member 30 has a plate-like shape and has a circular hole 31 extending therethrough. A second member 32 has a circular plate-like shape having the same thickness as the first member 30 and has such an outside diameter as to be exactly fitted into the circular hole 31 of the first member 30. The second member 32 is circular and is entirely fitted into the circular hole 31 of the first member 30.

The first and second members 30 and 32 are formed from, for example, any one of JIS 2000 aluminum alloys, JIS 5000 aluminum alloys, JIS 6000 aluminum alloys, and JIS 7000 aluminum alloys. The first and second members 30 and 32 may be formed from different materials.

Although unillustrated fully, the joining apparatus used in Embodiment 1 is used to join the first member 30 and the second member 32 together.

First, the first member 30 is placed on the bed 11 of the rotary table 10 and is then clamped on the bed 11 by means of the first-member clamp devices 12.

Next, the second member 32 is fitted into the circular hole 31 of the first member 30, thereby making the upper surface of a portion of the first member 30 around the circular hole 31 and the upper surface of the second member 32 flush with each other.

Then, the second member 32 is clamped on the bed 11 by means of the clamp apparatus 1 such that the axis of rotation of the presser member 3 coincides with the axis of the circular hole 31 of the first member 30 and the axis of the second member 32, thereby making the second member 32 immobile in relation to the first member 30. Specifically, the clamp body 2 is moved horizontally in a horizontal plane parallel with the surface of the bed 11 and is moved toward the bed 11 so as to place the presser member 3 on the second member 32 in such a manner that the axis of rotation of the presser member 3 coincides with the axis of the second member 32. Additionally, force directed toward the bed 11 is applied to the clamp body 2, thereby clamping the second member 32 on the bed 11 by means of the presser member 3 and thus making the second member 32 immobile in relation to the first member 30.

The circumferential wall of the circular hole 31 of the first member 30 and the circumferential wall of the second member 32 form an annular joint interface 33 therebetween.

As in the case of Embodiment 1, by use of the friction-stir-welding tool 20, the first and second members 30 and 31 are friction-stir-welded together at and around the annular joint interface 33. In the course of friction stir welding, a cooling medium is continuously fed into the medium supply channel 6 through the cooling-medium supply pipe 7. Preferably, the cooling medium is of gas phase. The cooling medium removes frictional heat, thereby suppressing a rise in temperature of the first and second members 30 and 31.

In the case where the entire upper surface of the second member 32 is flat as in the case of the present embodiment, the clamp apparatus 1 does not necessarily has the recess 5.

Embodiment 4

Figure 7:
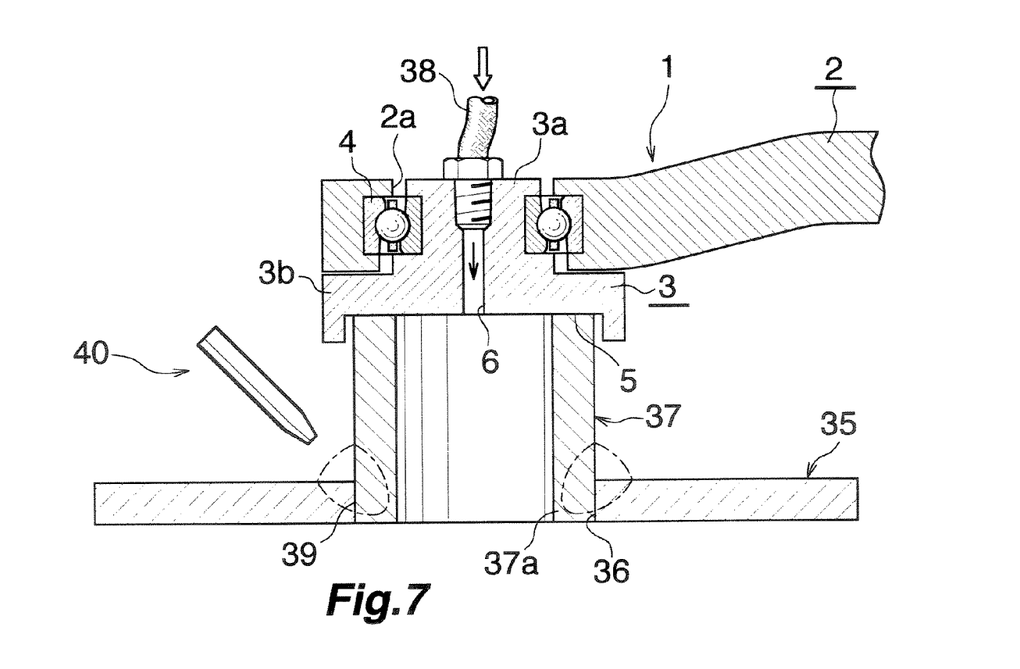
FIG. 7 is a vertical, sectional view showing a method of Embodiment 4 using the clamp apparatus according to the present invention as viewed before starting joining.

The present embodiment is shown in FIG. 7 and is implemented by applying the clamp apparatus 1 according to the present invention to joining of a first member having a circular hole and a second member having a circular portion to be fitted into the circular hole.

A first member 35 has a plate-like shape and has a circular hole 36 extending therethrough. A second member 37 has a cylindrical shape and has such an outside diameter as to be exactly fitted into the circular hole 36 of the first member 35. A lower end portion of the second member 37 is fitted into the circular hole 36 of the first member 35.

The first and second members 35 and 37 are formed from, for example, any one of JIS 2000 aluminum alloys, JIS 5000 aluminum alloys, JIS 6000 aluminum alloys, and JIS 7000 aluminum alloys. The first and second members 35 and 37 may be formed from the same material or from different materials.

Although unillustrated fully, the joining apparatus used in Embodiment 1 is used to join the first member 35 and the second member 37 together.

In the present embodiment, a heating-medium supply pipe 38 for feeding a heating medium into the medium supply channel 6 is rotatably connected to the presser member 3 in such a manner as to communicate with an upper end portion of the medium supply channel 6.

First, the first member 35 is placed on the bed 11 of the rotary table 10 and is then clamped on the bed 11 by means of the first-member clamp devices 12.

Next, a circular portion 37a of the second member 37 is fitted into the circular hole 36 of the first member 35. Then, the second member 37 is clamped on the bed 11 by means of the clamp apparatus 1 such that the axis of rotation of the presser member 3 coincides with the axis of the circular hole 36 of the first member 35 and the axis of the second member 37. Specifically, the clamp body 2 is moved horizontally in a horizontal plane parallel with the surface of the bed 11 and is moved toward the bed 11 so as to place the presser member 3 on the second member 37 in such a manner that the axis of rotation of the presser member 3 coincides with the axis of the circular hole 36 of the first member 35 and the axis of the second member 37. Additionally, force directed toward the bed 11 is applied to the clamp body 2, thereby clamping the second member 37 on the bed 11 by means of the presser member 3 and thus making the second member 37 immobile in relation to the first member 35.

The circumferential wall of the circular hole 36 of the first member 35 and the circumferential wall of the circular portion 37a of the second member 37 form an annular joint interface 39 therebetween.

Subsequently, by use of a fusion welding tool 40, the first member 35 and the second member 37 are welded together at and around the annular joint interface 39 between the circumferential wall of the circular hole 36 of the first member 35 and the circumferential wall of the circular portion 37a of the second member 37 by, for example, an arc welding process, a laser beam welding process, or an electron beam welding process.

Before this fusion welding is started, a heating medium is fed into the medium supply channel 6 through the heating-medium supply pipe 38. Preferably, the heating medium is of gas phase. By this procedure, the first and second members 35 and 37 can be preheated.

An object of the present invention is to solve the above problems and to provide a clamp apparatus which enables joining of two members without need to provisionally join the members at and around an annular joint interface therebetween, as well as a joining apparatus and a joining method.

To achieve the above object, the present invention comprises includes the following modes.

1) A clamp apparatus used when a first member having a circular hole and a second member having a circular portion are joined together with the circular portion being fitted into the circular hole, at and around an entire annular joint interface between a circumferential wall of the circular portion of the second member and a circumferential wall of the circular hole of the first member, the camp apparatus being adapted to clamp the second member so as to prevent movement of the second member in relation to the first member. The clamp apparatus includes: a clamp body; and a presser member attached to the clamp body in a manner rotatable about an axis of the circular hole of the first member.

2) In the clamp apparatus according to par. 1), a medium supply channel for supplying a cooling medium or a heating medium to the second member is formed in the presser member.

3) In the clamp apparatus according to par. 2), the medium supply channel assumes the form of a through-hole formed on an axis of rotation of the presser member.

4) In the clamp apparatus according to par. 1), the circular portion of the second member has a coaxially formed projection or recess, and a pressing face of the presser member has a recess or a projection which is to mate with the projection or the recess of the second member and is formed such that an axis thereof coincides with an axis of rotation of the presser member.

5) A joining apparatus includes: a rotary table; a bed fixedly provided on the rotary table; a first-member clamp device for fixing the first member on the bed such that the axis of the circular hole of the first member coincides with an axis of rotation of the rotary table; and a clamp apparatus according to any one of pars. 1) to 4).

6) A joining method for joining together a first member having a circular hole and a second member having a circular portion with the circular portion being fitted into the circular hole, at and around an entire annular joint interface between a circumferential wall of the circular portion of the second member and a circumferential wall of the circular hole of the first member. The joining method includes: preparing a clamp apparatus having a clamp body and a presser member attached to the clamp body in a manner rotatable about an axis of the circular hole of the first member; and joining the first member and the second member together at and around the annular joint interface therebetween while clamping the second member by the presser member of the clamp apparatus so as to prevent movement of the second member in relation to the first member and rotating the first and second members about the axis of the circular hole of the first member.

7) In the joining method according to par. 6), a medium supply channel for supplying a cooling medium or a heating medium to the second member is formed in the presser member, and, while the cooling medium or the heating medium is supplied to the second member through the medium supply channel of the presser member, the first member and the second member are joined together at and around the annular joint interface therebetween.

8) In the joining method according to par. 6), the circular portion of the second member has a coaxially formed projection or recess; the presser member of the clamp apparatus has a recess or a projection which is to mate with the projection or the recess of the second member and is formed such that an axis thereof coincides with an axis of rotation of the presser member; and while the projection or the recess of the second member and the recess or the projection of the presser member are mated with each other, the second member is clamped by the presser member of the clamp apparatus.

9) In the joining method according to par. 6), the first member and the second member are joined together by a friction stir welding process.

10) In the joining method according to par. 6), the first member and the second member are joined together by a fusion welding process.

11) A method of manufacturing a hollow member in which a base having a circular recess and a cover to be fitted into the recess and to close an opening of the recess are prepared, a stepped portion is formed on a circumferential wall of the recess at an intermediate depth for allowing a circumferential portion of the cover to rest thereon, and, after the cover is fitted into the recess such that the circumferential portion thereof rests on the stepped portion of the recess, the base and the cover are joined together at and around an annular joint interface between the circumferential wall of the recess of the base and a circumferential wall of the cover. The method of manufacturing a hollow member includes: preparing a clamp apparatus having a clamp body and a presser member attached to the clamp body in a manner rotatable about an axis of the recess of the base; and joining the base and the cover together at and around the annular joint interface therebetween while clamping the cover by the presser member of the clamp apparatus so as to prevent movement of the cover in relation to the base and rotating the base and the cover about the axis of the recess of the base.

12) In the method of manufacturing a hollow member according to par. 11), a medium supply channel for supplying a cooling medium or a heating medium to the cover is formed in the presser member, and, while the cooling medium or the heating medium is supplied to the cover through the medium supply channel of the presser member, the base and the cover are joined together at and around the annular joint interface therebetween.

13) In the method of manufacturing a hollow member according to par. 11), the cover has a projection or recess coaxially formed on an outer surface thereof; the presser member of the clamp apparatus has a recess or a projection which is to mate with the projection or the recess of the cover and is formed such that an axis thereof coincides with an axis of rotation of the presser member; and while the projection or the recess of the cover and the recess or the projection of the presser member are mated with each other, the cover is clamped in relation to the base by the presser member of the clamp apparatus.

14) In the method of manufacturing a hollow member according to par. 11), the base and the cover are joined together by a friction stir welding process.

15) In the method of manufacturing a hollow member according to par. 11), the base and the cover are joined together by a fusion welding process.

The clamp apparatus of par. 1) can clamp a second member having a circular portion by means of the presser member so as to prevent movement of the second member in relation to a first member having a circular hole at the time of joining the first member and the second member together with the circular portion being fitted into the circular hole, at and around an entire annular joint interface between a circumferential wall of the circular portion of the second member and a circumferential wall of the circular hole of the first member. In this clamped condition, the first and second members are joined together at and around the annular joint interface therebetween by fusion welding or friction stir welding while being rotated about the axis of the circular hole of the first member. Since the presser member is rotatable about the axis of the center hole of the first member, rotation of the first and second members is not hindered.

Thus, there is no need to provisionally join the first and second members at and around the annular joint interface therebetween, whereby joining can be performed in fewer steps. In contrast to the case where two members are provisionally joined at several points by a fusion welding process, a blowhole, cracks, lack of fusion, or a like defect does not arise. Therefore, a step of eliminating such defect becomes unnecessary, whereby joining can be performed in fewer steps. As a result, this joining work is excellently suited for mass production.

The clamp apparatus of par. 2) allows supply of a cooling medium to the second member through the medium supply channel in the course of friction-stir-welding the first member and the second member together at and around the annular joint interface therebetween. The cooling medium removes frictional heat induced by friction stir welding. Accordingly, even when joining consumes a long time, when members having high resistance to deformation are joined, or when members whose shapes are susceptible to accumulation of heat are joined, an increase in temperature difference between a joining start zone and a joining end zone is suppressed, and also occurrence of great variation in joining quality along the longitudinal direction of a joint zone is suppressed. Since an excessive increase in temperature at a joining end zone is suppressed, occurrence of defect at the joining end zone is prevented. Thus, an entire joint zone can exhibit a predetermined joint strength, and appearance of a weld bead is consistent.

In the course of fusion welding the first member and the second member together at and around the annular joint interface therebetween, the first and second members can be preheated by means of supplying a heating medium to the second member through the medium supply channel. For example, in the case of fusion welding members made of material having higher cold cracking susceptibility, such as high-tensile-strength steel, preheating lowers cooling speed during welding, thereby preventing hardening of a heat affected zone. Thus, cold crack can be suppressed.

The clamp apparatus of par. 3) allows simplification of the medium supply channel.

The clamp apparatus of par. 4) can prevent deviation in center alignment between the second member and the presser member during joining, thereby providing a stable clamping condition at all times.

According to the joining apparatus of par. 5), the first-member clamp device fixes the first member on the bed such that the axis of the circular hole of the first member coincides with an axis of rotation of the rotary table, and the presser member of the clamp apparatus of any one of pars. 1) to 4) clamps the second member on the bed with the circular portion of the second member fitted into the circular hole of the first member. In this condition, while being rotated through rotation of the rotary table, the first member and the second member are fusion-welded or friction-stir-welded at and around the annular joint interface therebetween. Since the presser member is rotatable about the axis of the circular hole of the first member, rotation of the first and second members is not hindered.

Thus, the first member and the second member can be joined together without need to be provisionally joined; i.e., a step of provisional joining is unnecessary. Therefore, this joining work is excellently suited for mass production.

According to the joining method of par. 6), a clamp apparatus having a clamp body and a presser member attached to the clamp body in a manner rotatable about an axis of a circular hole of a first member is prepared, and the first member and a second member are joined together, while being rotated about the axis of the circular hole of the first member, in a state in which the second member is clamped by the presser member of the clamp apparatus so as to prevent movement of the second member in relation to the first member. Thus, the first member and the second member can be joined together without need to be provisionally joined; i.e., a step of provisional joining is unnecessary. Therefore, this joining work is excellently suited for mass production. Furthermore, since the presser member is rotatable about the axis of the circular hole of the first member, rotation of the first and second members is not hindered.

The joining method of par. 7) allows supply of a cooling medium to the second member through the medium supply channel in the course of friction-stir-welding the first member and the second member together at and around the annular joint interface therebetween. The cooling medium removes frictional heat induced by friction stir welding. Accordingly, even when joining consumes a long time, when members having high resistance to deformation are joined, or when members whose shapes are susceptible to accumulation of heat are joined, an increase in temperature difference between a joining start zone and a joining end zone is suppressed, and also occurrence of great variation in joining quality along the longitudinal direction of a joint zone is suppressed. Since an excessive increase in temperature at a joining end zone is suppressed, occurrence of defect at the joining end zone is prevented. Thus, an entire joint zone can exhibit a predetermined joint strength, and appearance of a weld bead is consistent.

In the course of fusion welding the first member and the second member together at and around the annular joint interface therebetween, the first and second members can be preheated by means of supplying a heating medium to the second member through the medium supply channel. For example, in the case of fusion welding members made of material having higher cold cracking susceptibility, such as high-tensile-strength steel, preheating lowers cooling speed during welding, thereby Preventing hardening of a heat affected zone. Thus, cold crack can be suppressed.

The joining method of par. 8) can prevent deviation in center alignment between the second member and the presser member during joining, thereby providing a stable clamping condition at all times.

According to the method of manufacturing a hollow member of par. 11), a clamp apparatus having a clamp body and a presser member attached to the clamp body in a manner rotatable about the axis of the recess of the base is prepared, and the base and the cover are joined together at and around the annular joint interface therebetween, while being rotated about the axis of the recess of the base, in a state in which the cover is clamped by the presser member of the clamp apparatus so as to prevent movement of the cover in relation to the base. Thus, the cover and the base can be joined together without need to provisionally join the cover to the base; i.e., a step of provisional joining is unnecessary. Therefore, mass productivity of hollow members becomes excellent. Furthermore, since the presser member is rotatable about the axis of the recess of the base, rotation of the cover and the base is not hindered.

The method of manufacturing a hollow member of par. 12) allows supply of a cooling medium to the cover through the medium supply channel in the course of friction-stir-welding the base and the cover together at and around the annular joint interface therebetween. The cooling medium removes frictional heat induced by friction stir welding. Accordingly, even when joining consumes a long time, when members having high resistance to deformation are joined, or when members whose shapes are susceptible to accumulation of heat are joined, an increase in temperature difference between a joining start zone and a joining end zone is suppressed, and also occurrence of great variation in joining quality along the longitudinal direction of a joint zone is suppressed. Since an excessive increase in temperature at a joining end zone is suppressed, occurrence of defect at the joining end zone is prevented. Thus, an entire joint zone can exhibit a predetermined joint strength, and appearance of a weld bead is consistent.

In the course of fusion welding the base and the cover together at and around the annular joint interface therebetween, the base and the cover can be preheated by means of supplying a heating medium to the cover through the medium supply channel. For example, in the case of fusion welding the base and the cover which are made of material having higher cold cracking susceptibility, such as high-tensile-strength steel, preheating lowers cooling speed during welding, thereby Preventing hardening of a heat affected zone. Thus, cold crack can be suppressed.

The method of manufacturing a hollow member of par. 13) can prevent deviation in center alignment between the cover and the presser member during joining, thereby providing a stable clamping condition at all times.

What is claimed is:

1. A joining method for joining together a first member having a circular hole and a second member having a circular portion with the circular portion being fitted into the circular hole, at and around an entire annular joint interface between a circumferential wall of the circular portion of the second member and a circumferential wall of the circular hole of the first member, comprising the steps of:

preparing a clamp apparatus having a clamp body and a presser member attached to the clamp body in a manner rotatable about an axis of the circular hole of the first member; and joining the first member and the second member together at and around the annular joint interface therebetween while clamping the second member by the presser member of the clamp apparatus so as to prevent movement of the second member in relation to the first member and rotating the first and second members about the axis of the circular hole of the first member.

2. A joining method according to claim 1, wherein a medium supply channel for supplying a cooling medium or a heating medium to the second member is formed in the presser member, and, while the cooling medium or the heating medium is supplied to the second member through the medium supply channel of the presser member, the first member and the second member are joined together at and around the annular joint interface therebetween.

3. A joining method according to claim 1, wherein the circular portion of the second member has a coaxially formed projection or recess; the presser member of the clamp apparatus has a recess or a projection which is to mate with the projection or the recess of the second member and is formed such that an axis thereof coincides with an axis of rotation of the presser member; and while the projection or the recess of the second member and the recess or the projection of the presser member are mated with each other, the second member is clamped by the presser member of the clamp apparatus.

4. A joining method according to claim 1, wherein the first member and the second member are joined together by a friction stir welding process.

5. A joining method according to claim 1, wherein the first member and the second member are joined together by a fusion welding process.

6. A method of manufacturing a hollow member in which a base having a circular recess and a cover to be fitted into the recess and to close an opening of the recess are prepared, a stepped portion is formed on a circumferential wall of the recess at an intermediate depth for allowing a circumferential portion of the cover to rest thereon, and, after the cover is fitted into the recess such that the circumferential portion thereof rests on the stepped portion of the recess, the base and the cover are joined together at and around an annular joint interface between the circumferential wall of the recess of the base and a circumferential wall of the cover, comprising the steps of:

preparing a clamp apparatus having a clamp body and a presser member attached to the clamp body in a manner rotatable about an axis of the recess of the base; and joining the base and the cover together at and around the annular joint interface therebetween while clamping the cover by the presser member of the clamp apparatus so as to prevent movement of the cover in relation to the base and rotating the base and the cover about the axis of the recess of the base.

7. A method of manufacturing a hollow member according to claim 6, wherein a medium supply channel for supplying a cooling medium or a heating medium to the cover is formed in the presser member, and, while the cooling medium or the heating medium is supplied to the cover through the medium supply channel of the presser member, the base and the cover are joined together at and around the annular joint interface therebetween.

8. A method of manufacturing a hollow member according to claim 6, wherein the cover has a projection or recess coaxially formed on an outer surface thereof; the presser member of the clamp apparatus has a recess or a projection which is to mate with the projection or the recess of the cover and is formed such that an axis thereof coincides with an axis of rotation of the presser member; and while the projection or the recess of the cover and the recess or the projection of the presser member are mated with each other, the cover is clamped in relation to the base by the presser member of the clamp apparatus.

9. A method of manufacturing a hollow member according to claim 6, wherein the base and the cover are joined together by a friction stir welding process.

10. A method of manufacturing a hollow member according to claim 6, wherein the base and the cover are joined together by a fusion welding process.

* * * * *